United States Patent
Zhang et al.

(10) Patent No.: US 10,787,566 B2
(45) Date of Patent: Sep. 29, 2020

(54) NON-SILICON DEFOAMING AGENT

(71) Applicant: JIANGSU SIXIN SCIENTIFIC-TECHNOLOGICAL APPLICATION RESEARCH INSTITUTE CO., LTD., Nanjing (CN)

(72) Inventors: Zhen Zhang, Nanjing (CN); Yang Liu, Nanjing (CN); Tian Cao, Nanjing (CN)

(73) Assignee: JIANGSU SIXIN SCIENTIFIC-TECHNOLOGICAL APPLICATION RESEARCH INSTITUTE CO., LTD., Nanjing (CN)

( * ) Notice: Subject to any disclaimer, the term of this patent is extended or adjusted under 35 U.S.C. 154(b) by 0 days.

(21) Appl. No.: 16/610,924

(22) PCT Filed: Dec. 22, 2017

(86) PCT No.: PCT/CN2017/117874
§ 371 (c)(1),
(2) Date: Nov. 5, 2019

(87) PCT Pub. No.: WO2018/201736
PCT Pub. Date: Nov. 8, 2018

(65) Prior Publication Data
US 2020/0056034 A1 Feb. 20, 2020

(30) Foreign Application Priority Data

May 5, 2017 (CN) .......................... 2017 1 0312000

(51) Int. Cl.
C08L 51/08 (2006.01)
B01D 19/04 (2006.01)
C08F 220/28 (2006.01)
C08F 220/18 (2006.01)
C08F 283/06 (2006.01)

(52) U.S. Cl.
CPC .......... C08L 51/08 (2013.01); B01D 19/0404 (2013.01); C08F 220/18 (2013.01); C08F 220/28 (2013.01); C08F 283/065 (2013.01); C08F 220/1808 (2020.02); C08F 220/281 (2020.02)

(58) Field of Classification Search
None
See application file for complete search history.

(56) References Cited

U.S. PATENT DOCUMENTS

| 5,152,925 | A | 10/1992 | Furman |
| 5,766,513 | A * | 6/1998 | Pillon ................ B01D 19/0404 252/78.3 |
| 7,700,527 | B2 * | 4/2010 | Fang ................... C10M 147/04 508/458 |
| 2017/0015897 | A1 | 1/2017 | Hernandez Carbajal et al. |
| 2017/0283534 | A1 * | 10/2017 | Hern Ndez Carbajal ................... C08F 220/18 |

FOREIGN PATENT DOCUMENTS

| CN | 101362063 A | 2/2009 |
| CN | 100531850 C | 8/2009 |
| CN | 101638871 B | 1/2011 |
| CN | 102126763 A | 7/2011 |
| CN | 101189282 B | 8/2011 |
| CN | 102428142 A | 4/2012 |
| CN | 102002242 B | 8/2012 |
| CN | 101991975 B | 12/2012 |
| CN | 103603215 A | 2/2014 |
| CN | 102428142 B | 5/2014 |
| CN | 102976429 B | 9/2014 |
| CN | 105744998 A | 7/2016 |

* cited by examiner

Primary Examiner — Tae H Yoon
(74) Attorney, Agent, or Firm — Bayramoglu Law Offices LLC

(57) ABSTRACT

A non-silicon defoaming agent, includes an acrylate polymer, an organic solvent carrier, hydrophobic particles and defoaming auxiliaries; and the acrylate polymer is prepared from following raw material components: monomer-1, monomer-2, unsaturated terminated polyether, alkene, diluent and initiator. The present invention further includes a preparing method for the non-silicon defoaming agent and the application of the non-silicon defoaming agent to the defoaming and foam inhibiting in systems rich in anionic surfactants. The defoaming agent takes the acrylate polymer as the main active substance and has excellent defoaming and foam inhibiting performance. By dropwise adding monomers, the defoaming performance of the acrylate polymer is improved, by using unsaturated terminated polyether to modify, the hydrophilia of the acrylate polymer is improved, the instant defoaming capacity is further improved, and by the alkene with the carbon atoms of 6-22 to modify, the foam inhibiting performance of the defoaming agent is improved.

7 Claims, No Drawings

NON-SILICON DEFOAMING AGENT

CROSS REFERENCE TO THE RELATED APPLICATIONS

This application is the national phase entry of International Application No. PCT/CN2017/117874, filed on Dec. 22, 2017, which based upon and claimed priority to Chinese Patent Application NO. 201710312000.9, filed on May 5, 2017, the entire contents of which are incorporated herein by reference.

TECHNICAL FIELD

The present invention belongs to the technical field of preparations of fine chemical engineering, relates to a fine chemical preparation, in particular to a non-silicon defoaming agent, specifically to say, a non-silicon defoaming agent containing an acrylate polymer and the application thereof in the systems rich in anionic surfactants in the industries of papermaking, water treatment, textile and the like.

BACKGROUND

A defoaming agent is a composition for controlling foams in various working procedures in industrial production. In industrial production, particularly papermaking, water treatment and textile, since the system has rich water and added massive chemical auxiliaries, in addition, large amount of mechanical energy generated in processes such as stirring, washing and thickening, foams are extremely easily generated. Liquid mediums (for example, water), chemical auxiliaries (for example, surfactants), air source and mechanical energy are main reasons why the foams are generated in the industry.

Development of the defoaming agents is to eliminate unnecessary foams in industrial production. The defoaming agents are mainly divided into non-silicon defoaming agents and organic silicon defoaming agents, common non-silicon defoaming agents take mineral oil, polyether, amide or fatty alcohol as an active substance, and the organic silicon defoaming agent take polysiloxane as an active substance.

The defoaming agent described in Patent CN10051850C is prepared from organic hydrocarbon, white carbon black, silicon polyether and an emulsifier, is improved in the defoaming and foam inhibiting performance, and can be applied to the working procedures of papermaking, cloth coating, circuit panel developing, metal cleaning and the like. Patent CN101991975B provides a mineral oil defoaming agent, which is prepared from mineral oil, fatty acid metal soap, fatty acid amide, white carbon black, defoaming auxiliary and an emulsifier, and has better defoaming and foam inhibiting effects in the processes such as papermaking and water treatment. The defoaming agents mentioned in above patents belong to the mineral oil defoaming agent, namely, the defoaming agent taking the mineral oil as a carrier, but the mineral oil which is a hydrocarbon oil substance by the way can generate the harmful substance tetrachlorodibenzo-p-dioxin, which harms the environment and a human body, and is defective in the defoaming capacity in a system rich in anionic surfactants.

As the main active substance of the mineral oil defoaming agent, alkylidene amide for example, EBS is commonly used, and other diamides or a mixture of the diamides can also be used in such defoaming agent. Patent Application CN101362063 describes a defoaming agent which is prepared from plant oil, EBS and other types of amides and is mainly used in the textile printing and dyeing industry. Patent CN102976429B describes a defoaming agent which is mainly used for water treatment and is mainly prepared from the EBS, liquid paraffin, kerosene, simethicone and white carbon black. In a use process, the EBS in such mineral oil defoaming agent has higher hydrophobicity, and is thus easy to deposit and affects production efficiency and product quality.

Patent CN103603215A describes an organic silicon defoaming agent for textile printing and dyeing, which is prepared by reaction between silicone grease and polyether modified polysiloxane in presence of an organic tin catalyst. Patent CN102002242B describes an organic silicon emulsion defoaming agent which is prepared from polysiloxane composition, fatty alcohol polyether, emulsifier, polyether modified polysiloxane and water and is suitable for the industries such as papermaking and textile. The defoaming agents mentioned in above patents all adopt silicone grease as an active substance, however, due to the hydrophobicity of the silicone grease, the silicone grease will be gradually separated out in a use process of the defoaming agent and will be massively separated out in a case of long term accumulation of the defoaming agent, thus, the product quality is affected on one aspect and the silicone grease is deposited on a device and is hard to wash, even device blockage is caused. Hence, although it is widely believed that the silicone grease has the characteristics of defoaming rapidness and defoaming durability, the defoaming agent product containing the silicone grease is avoided in many industrial productions.

Therefore, demands on the defoaming agent without hydrocarbon oil, EBS or silicone grease become more and more. Patent CN101638871B describes a defoaming agent which is prepared from fatty acid methyl ester derivative, polyether and natural grease, and is suitable for a papermaking wet end procedure, papermaking sewage treatment and elimination of other water phase foams. Patent CN102126763A describes a defoaming agent which is prepared from polyether and lower alcohol and is mainly used for treatment of garbage penetrating fluid. Above patents do not use the mineral oil and avoid the damage of the mineral oil to the environment, but the non-silicon defoaming agent taking the polyether or fatty acid as the active substance is not entirely satisfactory in the defoaming and foam inhibiting performance in the systems rich in anionic surfactants, and the defoaming capacity cannot meet the requirements of industrial production. So, researchers improve the defoaming agent based on the existing defoaming agent on one aspect and develop a new defoaming agent to fundamentally solve the problem, and an acrylate defoaming agent is a research hot spot.

Patent U.S. Pat. No. 5,152,925 describes a defoaming agent taking acrylic resin as a main defoaming active substance, wherein an acrylate polymer mainly takes the acrylic resin prepared by a hydroxyl group-containing acrylic monomer in an organic diluent DIDP as a main active substance, and is applied to coarse pulp washing and other papermaking procedures. Patent CN102428142B also mentions the defoaming agent prepared by taking the acrylate polymer as a main active substance, wherein the acrylate polymer is prepared from monomers of iso-octyl acrylate, hydroxyalkyl acrylate and acrylic acid in the organic diluent DIOA, and the prepared acrylate polymer serves as the main active substance of the defoaming agent and is compounded with white carbon black and alkyl silicone oil, and is applied to the industries of petroleum, water treatment, pigments and coating, food and beverage machining, mining, textile, agriculture and papermaking. Such defoaming agent can solve the problems of environment harmness and silicon separating out and residue, but the defoaming performance of the defoaming agent prepared by current technology still has greater improving potential. Therefore, the improvement of the defoaming and foam inhibiting performance of the acrylate polymer defoaming agent still has important meaning.

SUMMARY

The present invention introduces a defoaming agent taking an acrylate polymer as a main active substance, and the defoaming agent has excellent defoaming and foam inhibiting performance, and is particularly suitable for the systems rich in anionic surfactants. According to the acrylate polymer, based on the alkyl acrylate and/or alkyl methacrylate and hydroxyalkyl acrylate and/or hydroxyalkyl methylacrylate, through dropwise adding monomers step by step, the defoaming performance of the polymer is improved, secondly, unsaturated terminated polyether is used for modification to improve the hydrophilia of the acrylate polymer, thus improving the dispersive power of the acrylate polymer in water and further improving the instant defoaming capacity; and finally, by modifying through the alkenes with the carbon atoms of 6-22, the foam inhibiting performance of the defoaming agent is improved due to the hydrophobic performance of the alkenes. Through a specific polymerization process, the defoaming capacity of the synthesized acrylate polymer is further improved. The defoaming agent in the present invention further contains an organic solvent carrier, hydrophobic particles, defoaming auxiliaries and the like.

Aims of the present invention are realized by following technical solutions:

A non-silicon defoaming agent comprises an acrylate polymer, an organic solvent carrier, hydrophobic particles and defoaming auxiliaries; the use level of the acrylate polymer is 15-70% of the total mass of the defoaming agent, the use level of the organic solvent carrier is 10-70% of the total mass of the defoaming agent, the use level of the hydrophobic particles is 0.1-15% of the total mass of the defoaming agent, and the use level of the defoaming auxiliaries is 1-25% of the total mass of the defoaming agent;

the acrylate polymer is prepared from following raw material components: monomer-1, monomer-2, unsaturated terminated polyether, alkene, diluent and initiator; the total use level of the monomer-1 and monomer-2 is 20-70% of the total mass of the raw material components, the use level of the unsaturated terminated polyether is 1-10% of the total mass of the raw material components, the use level of the alkene is 1-8% of the total mass of the raw material components the use level of the diluent is 20-75% of the total mass of the raw material components, and the use level of the initiator is 0.2-1% of the total mass of the raw material components.

Preferably, use level of the acrylate polymer is 20-60% of the total mass of the defoaming agent, the use level of the organic solvent carrier is 10-70% of the total mass of the defoaming agent, the use level of the hydrophobic particles is 0.5-10% of the total mass of the defoaming agent, and the use level of the defoaming auxiliaries is 2-20% of the total mass of the defoaming agent.

Preferably, the total use level of the monomer-1 and monomer-2 is 20-60% of the total mass of the raw material components, the use level of the unsaturated terminated polyether is 1-8% of the total mass of the raw material components, the use level of the alkene is 1-8% of the total mass of the raw material components the use level of the diluent is 30-70% of the total mass of the raw material components, and the use level of the initiator is 0.4-0.8% of the total mass of the raw material components.

A preparing method of the acrylate polymer described in the present invention comprises:

(1), mixing the monomer-1, monomer-2 and unsaturated terminated polyether which are 70-90% of the total use level of the monomer-1 with the initiator which is 50-70% of the total use level of the initiator to cause the initiator to be fully dissolved and form a mixture a;

(2), mixing the alkene with the initiator which is 5-15% of the total use level of the initiator to fully dissolve the initiator and form a mixture b;

(3), mixing the rest monomer-1 with the initiator which is 2-15% of the total use level of the initiator to fully dissolve the initiator and form a mixture c;

(4), at 60-100° C., fully dissolving the initiator which is 8-15 of the total use level of the initiator in the diluent, and releasing free radicals to form a mixture d;

(5), at 60-100° C., in order to prevent the generation of excessive free radicals which cause severe polymerization and further cause danger, dropwise adding the mixture a into the mixture d, controlling the dropwise adding time to be 1-5 h, and forming a mixture e; during dropwise adding, enabling the temperature to be 60-100° C. by circulated water or ice bath;

(6), after completely dropwise adding the mixture a, at 60-100° C., similarly, in order to prevent the generation of excessive free radicals which cause severe polymerization and further cause danger, dropwise adding the mixture b into the mixture e, controlling the dropwise adding time to be 1-2 h, and forming a mixture f; during dropwise adding, enabling the temperature to be 60-100° C. by circulated water or ice bath;

(7), after completely dropwise adding the mixture b, at 60-100° C., dropwise adding the mixture c into the mixture f, controlling the dropwise adding time to be 1-2 h, and forming a mixture g; during dropwise adding, enabling the temperature to be 60-100° C. by circulated water or ice bath;

(8), after completely dropwise adding the mixture c, at 60-100° C., adding the rest initiator into the mixture g, then regulating the temperature to 80-120° C. and performing thermal insulation at such temperature for 1-3 h; and (9), distilling for 0.5-3 h at the vacuum degree of −0.09-- 0.1 MPa and the temperature of 90-110° C. to remove micromolecular impurities, thus obtaining the acrylate polymer.

The micromolecular impurities in the present invention refer to the unreacted monomer-1 and monomer-2 and other micromolecular raw material components.

A. Monomers

The monomers are monomers which vinyl-containing non-ionic monomers which can form a polymer capable of being in an organic solvent, these monomers can be mixed with two by two or more for use, for example, acrylate ester, methylacrylate ester, hydroxyalkyl acrylate, hydroxyalkyl methylacrylate, fumaric acid diester, maleic acid diester, which comprise but are not limited to: methyl acrylate, ethyl acrylate, butyl acrylate, dodecyl acrylate, octadecyl acrylate, iso-octyl acrylate, methyl methacrylate, ethyl methylacrylate, butyl methacrylate, dodecyl methacrylate, octadecyl methylacrylate, iso-octyl methacrylate, hydroxyethyl acrylate, hydroxypropyl acrylate, hydroxyethyl methylacrylate, hydroxypropyl methacrylate, dimethyl fumarate, diethyl fumarate, dibutyl fumarate, diisopropyl fumarate, diethyl maleate, bis(2-ethylhexyl) maleate and dioctyl maleate, and can also comprise styrene, acrylonitrile, acetic acid vinyl ester, acrylic acid and methacrylic acid.

The monomer-1 is alkyl acrylate or octadecyl methacrylate; the monomer-2 is hydroxyalkyl acrylate or hydroxyalkyl methylacrylate as shown in following general formulas:

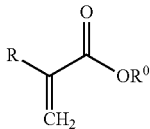

wherein, R is H or methyl; $R^0$ is a straight chain or a branched chain alkyl of 1-20 carbon atoms, and any position of which at least contains one hydroxy; those skilled in the art know that the straight chain or a branched chain alkyl of 1-20 carbon atoms, any position of which at least contains one hydroxyl, comprises but is not limited to 1-hydroxyethyl, 2-ethoxy, 1-hydroxypropyl, 2-hydroxypropyl, 3-hydroxypropyl, 1-hydroxyl isopropyl, 2-hydroxyl isopropyl, 3-hydroxyl isopropyl, 1-hydroxyl butyl, 2-hydroxyl butyl, 3-hydroxyl butyl or 4-hydroxyl butyl.

Preferably, the monomer-1 is iso-octyl acrylate or iso-octyl methacrylate; the monomer-2 is hydroxyethyl acrylate or hydroxyethyl methylacrylate.

The ratio (mass ratio) of the monomer-1 to the monomer-2 is controlled between 1:1-4:1.

B. Unsaturated Terminated Polyether

The unsaturated terminated polyether is as shown in the following general formula:

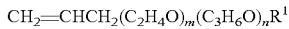

wherein, $R_1$ is an alkyl or phenyl with 1-4 carbon atoms or the group as shown in $CH_3(CH_2)_xCO—$, the subscript x is an integer between 8-16 (namely an acyl formed by a C10-C18 straight chain saturated fatty acid); m and n are integers, and the ratio of the subscript m to n is 1:9-3:2; and the molecular weight of the unsaturated terminated polyether is between 400-2500.

C. Alkene

The alkene is as shown in the following general formula:

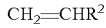

wherein, $R^2$ is a straight chain or branched chain alkyl with 4-20 carbon atoms.

D. Diluent

Proper diluent instances used for the present invention can be selected from but are not limited to di-iso-decylphthalate, diisooctyl adipate, diisooctyl adipate, dioctyl adipate, 2-ethyl-1-hexyl alcohol, isooctanol, polyethylene glycol with the molecular weight of 300-2000, polypropylene glycol with the molecular weight of 300-2000, and polytetramethylene glycol with the molecular weight of 300-2000, which can be singly used or combined for use. Preferably, the diluent is the polypropylene glycol with the molecular weight of 300-2000.

E. Initiator

Initiator instances used for generating free radicals in the present invention are selected from but are not limited to 2,2'-azobis(2-methyl propionitrile), 2,2'-azobis(2,4-dimethyl valeronitrile), 2,2'-azobis(2-methyl butyronitrile) and benzoyl peroxide, or a redox initiator system can be used, for example, a bromate/sulfide or peroxysulphate/ferrous system. Preferably, the initiator is benzoyl peroxide.

G. Organic Solvent Carrier

Proper organic solvent carrier instances used for the present invention can be selected from but are not limited to di-iso-decylphthalate, diisooctyl adipate, diisooctyl adipate, dioctyl adipate, 2-ethyl-1-hexyl alcohol, isooctanol, polytetramethylene glycol with the molecular weight of 300-2000, polybutylene with the molecular weight of 400-2000, polyethylene glycol with the molecular weight of 300-2000 or polyether ester formed by the polyethylene glycol and fatty acid, and polypropylene glycol with the molecular weight of 300-2000 or polyether ester formed by the polyethylene glycol and fatty acid, which can be singly used or combined for use; and preferably, the organic solvent carrier is the polypropylene glycol with the molecular weight of 300-2000.

H. Hydrophobic Particles

The hydrophobic particles are inorganic hydrophobic particles, and specific instances comprise but are not limited to fatty acid magnesium salt, fatty acid calcium salt, fatty acid aluminum salt, fatty acid zinc salt or hydrophobic precipitation-method white carbon black with the specific area of 20-500 $m^2/g$, which can be singly used or combined for use; and preferably, the hydrophobic particles are the hydrophobic precipitation-method white carbon black with the specific area of 20-500 $m^2/g$.

I. Defoaming Auxiliaries

The defoaming auxiliaries are selected from but are not limited to alkoxy polysiloxane, alkyl modified polysiloxane, fluorine modified polysiloxane, sulphur modified polysiloxane, polyether-modified polysiloxane or hydroxyl modified polysiloxane; and preferably, the defoaming auxiliaries are selected from polyether-modified polysiloxane or alkyl modified polysiloxane.

The preparing method for the non-silicon defoaming agent comprises the following steps: uniformly mixing the acrylate polymer, the organic solvent carrier, the hydrophobic particles and the defoaming auxiliaries, thus obtaining the defoaming agent in the present invention.

At normal temperature, (20-30° C.), the acrylate polymer, the organic solvent carrier, the hydrophobic particles and the defoaming auxiliaries are uniformly mixed to prepare the non-silicon defoaming agent of the present invention in a stirring manner or other manners such as ultrasonic.

The non-silicon defoaming agent in the present invention is applied to the defoaming and foam inhibiting of systems rich in anionic surfactants, for example, to the defoaming and foam inhibiting of industries of papermaking, water treatment and the like.

The present has the beneficial effects:

The defoaming agent in the present invention takes the acrylate polymer as the main active substance, and the defoaming agent has excellent defoaming and foam inhibiting performance, and is particularly suitable for the systems rich in anionic surfactants. According to the acrylate polymer, based on the alkyl acrylate and/or alkyl methacrylate and hydroxyalkyl acrylate and/or hydroxyalkyl methylacrylate, through dropwise adding monomers step by step, the defoaming performance of the polymer is improved, secondly, unsaturated terminated polyether is used for modification to improve the hydrophilia of the acrylate polymer, thus improving the dispersive power of the acrylate polymer in water and further improving the instant defoaming capacity; and finally, by modifying through the alkenes with the carbon atoms of 6-22, the foam inhibiting performance of the defoaming agent is improved due to the hydrophobic performance of the alkenes.

DETAILED DESCRIPTION OF THE EMBODIMENTS

In following embodiments, the instances of the acrylate polymer F are as follows:

| Acrylate polymer F | Monomer-1 | Monomer-2 | Unsaturated terminated polyether | Alkene | Diluent | Initiator |
|---|---|---|---|---|---|---|
| F1 | Iso-octyl acrylate | Hydroxyethyl acrylate | B1 | C1 | PPG1000 | Benzoyl peroxide |
| F2 | Iso-octyl acrylate | Hydroxyethyl methylacrylate | B2 | C2 | PPG600 | Benzoyl peroxide |
| F3 | Iso-octyl methacrylate | Hydroxyethyl acrylate | B3 | C3 | PPG2000 | Benzoyl peroxide |
| F4 | Iso-octyl methacrylate | Hydroxyethyl methylacrylate | B4 | C4 | PPG400 | Benzoyl peroxide |

In following embodiments, the instances of the unsaturated terminated polyether B are as follows:

| Unsaturated terminated polyether B | $R^1$ | m | n |
|---|---|---|---|
| B1 | —$CH_3$ | 16 | 24 |
| B2 | —$CH_2(CH_2)_2CH_3$ | 2 | 18 |
| B3 | —$C_6H_5$ | 3 | 3 |
| B4 | $CH_3(CH_2)_{10}CO$— | 12 | 8 |

In following embodiments, the instances of the unsaturated terminated polyether B are as follows:

| Alkene C | $R^2$ |
|---|---|
| C1 | —$(CH_2)_{13}CH_3$ |
| C2 | —$(CH_2)_7CH_3$ |
| C3 | —$(CH_2)_{19}CH_3$ |
| C4 | —$(CH2)_3CH_3$ |

Embodiment 1

(1) mixing 80 g of iso-octyl acrylate, 100 g of hydroxyethyl acrylate, 80 g of unsaturated terminated polyether B1 and 4.8 g of benzoyl peroxide, and fully dissolving the benzoyl peroxide by stirring to form a mixture a1;

(2) mixing 50 g of alkene C1 and 0.8 g of benzoyl peroxide through stirring to fully dissolve the benzoyl peroxide and form a mixture b1;

(3) mixing rest 20 g of iso-octyl acrylate and 0.8 g of benzoyl peroxide through stirring to fully dissolve the benzoyl peroxide and form a mixture c1;

(4) adding 0.8 g of benzoyl peroxide into 662 g of diluent PPG1000 while stirring, after complete adding of the benzoyl peroxide, heating to 80° C., performing thermal insulation for 10 min to fully dissolve the benzoyl peroxide and form a mixture d1;

(5) under cooling of circulated cooling water, keeping the temperature of the mixture d1 at 80° C., dropwise adding the mixture a1 into the mixture d1 while stirring, and completely dropwise adding within 3 h to form a mixture e1;

(6) after complete dropwise adding of the mixture a1, under cooling of the circulated cooling water, continuing to keep the temperature at 80° C., continuing to dropwise add the mixture b1 into the mixture e1, and completely dropwise adding within 1.5 h to form a mixture f1;

(7), after complete dropwise adding of the mixture b1, under cooling of the circulated cooling water, continuing to keep the temperature at 80° C., continuing to dropwise add mixture c1 into the mixture f1, and completely dropwise adding within 1.5 h to form a mixture g1;

(8) after complete dropwise adding of the mixture c1, under cooling of the circulated cooling water, continuing to keep the temperature at 80° C., adding rest 0.8 g of benzoyl peroxide into the mixture g1, after adding the benzoyl peroxide, controlling the temperature at 120° C., and performing thermal insulation for 1 h; and (9) finally, distilling for 2 h at the vacuum degree of −0.09 MPa and the temperature of 100° C. to remove micromolecular impurities, thus obtaining the acrylate polymer F1.

Embodiment 2

(1) mixing 320 g of iso-octyl acrylate, 200 g of hydroxyethyl methylacrylate, 10 g of unsaturated terminated polyether B2 and 2.4 g of benzoyl peroxide, and fully dissolving the benzoyl peroxide by stirring to form a mixture a2;

(2) mixing 40 g of alkene C2 and 0.4 g of benzoyl peroxide through stirring to fully dissolve the benzoyl peroxide and form a mixture b2;

(3) mixing rest 80 g of iso-octyl acrylate and 0.4 g of benzoyl peroxide through stirring to fully dissolve the benzoyl peroxide and form a mixture c2;

(4) adding 0.4 g of benzoyl peroxide into 346 g of diluent PPG600 while stirring, after complete adding of the benzoyl peroxide, heating to 100° C., performing thermal insulation for 10 min to fully dissolve the benzoyl peroxide and form a mixture d2;

(5) under cooling of circulated cooling water, keeping the temperature of the mixture d2 at 100° C., dropwise adding the mixture a2 into the mixture d2 while stirring, and completely dropwise adding within 5 h to form a mixture e2;

(6) after complete dropwise adding of the mixture a2, under cooling of the circulated cooling water, continuing to keep the temperature at 100° C., continuing to dropwise add the mixture b2 into the mixture e2, and completely dropwise adding within 2 h to form a mixture f2;

(7), after complete dropwise adding of the mixture b2, under cooling of the circulated cooling water, continuing to keep the temperature at 100° C., continuing to dropwise add mixture c2 into the mixture f2, and completely dropwise adding within 1 h to form a mixture g2;

(8) after complete dropwise adding of the mixture c2, under cooling of the circulated cooling water, continuing to keep the temperature at 100° C., adding rest 0.4 g of benzoyl peroxide into the mixture g2, after adding the benzoyl peroxide, controlling the temperature at 100° C., and performing thermal insulation for 3 h; and (9) finally, distilling for 1 h at the vacuum degree of −0.09 MPa and the temperature of 100° C. to remove micromolecular impurities, thus obtaining the acrylate polymer F2.

Embodiment 3

(1) mixing 240 g of iso-octyl methylacrylate, 100 g of hydroxyethyl acrylate, 50 g of unsaturated terminated polyether B3 and 3.6 g of benzoyl peroxide, and fully dissolving the benzoyl peroxide by stirring to form a mixture a3;

(2) mixing 80 g of alkene C3 and 0.6 g of benzoyl peroxide through stirring to fully dissolve the benzoyl peroxide and form a mixture b3;

(3) mixing rest 60 g of iso-octyl methylacrylate and 0.6 g of benzoyl peroxide through stirring to fully dissolve the benzoyl peroxide and form a mixture c3;

(4) adding 0.6 g of benzoyl peroxide into 464 g of diluent PPG2000 while stirring, after complete adding of the benzoyl peroxide, heating to 60° C., performing thermal insulation for 20 min to fully dissolve the benzoyl peroxide and form a mixture d3;

(5) under cooling of circulated cooling water, keeping the temperature of the mixture d3 at 60° C., dropwise adding the mixture a3 into the mixture d3 while stirring, and completely dropwise adding within 1 h to form a mixture e3;

(6) after complete dropwise adding of the mixture a3, under cooling of the circulated cooling water, continuing to keep the temperature at 60° C., continuing to dropwise add the mixture b3 into the mixture e3, and completely dropwise adding within 1 h to form a mixture f3;

(7), after complete dropwise adding of the mixture b3, under cooling of the circulated cooling water, continuing to keep the temperature at 60° C., continuing to dropwise add mixture c3 into the mixture f3, and completely dropwise adding within 2 h to form a mixture g3;

(8) after complete dropwise adding of the mixture c3, under cooling of the circulated cooling water, continuing to keep the temperature at 60° C., adding rest 0.6 g of benzoyl peroxide into the mixture g3, after adding the benzoyl peroxide, controlling the temperature at 80° C., and performing thermal insulation for 2 h; and (9) finally, distilling for 3 h at the vacuum degree of −0.1 MPa and the temperature of 100° C. to remove micromolecular impurities, thus obtaining the acrylate polymer F3.

Embodiment 4

(1) mixing 320 g of iso-octyl methylacrylate, 100 g of hydroxyethyl methylacrylate, 40 g of unsaturated terminated polyether B4 and 3 g of benzoyl peroxide, and fully dissolving the benzoyl peroxide by stirring to form a mixture a4;

(2) mixing 10 g of alkene C4 and 0.5 g of benzoyl peroxide through stirring to fully dissolve the benzoyl peroxide and form a mixture b4;

(4) mixing rest 80 g of iso-octyl methylacrylate and 0.5 g of benzoyl peroxide through stirring to fully dissolve the benzoyl peroxide and form a mixture c4;

(4) adding 0.5 g of benzoyl peroxide into 445 g of diluent PPG400 while stirring, after complete adding of the benzoyl peroxide, heating to 90° C., performing thermal insulation for 15 min to fully dissolve the benzoyl peroxide and form a mixture d4;

(5) under cooling of circulated cooling water, keeping the temperature of the mixture d4 at 90° C., dropwise adding the mixture a4 into the mixture d4 while stirring, and completely dropwise adding within 2 h to form a mixture e4;

(6) after complete dropwise adding of the mixture a4, under cooling of the circulated cooling water, continuing to keep the temperature at 90° C., continuing to dropwise add the mixture b4 into the mixture e4, and completely dropwise adding within 2 h to form a mixture f4;

(7), after complete dropwise adding of the mixture b4, under cooling of the circulated cooling water, continuing to keep the temperature at 90° C., continuing to dropwise add mixture c4 into the mixture f4, and completely dropwise adding within 2 h to form a mixture g4;

(8) after complete dropwise adding of the mixture c4, under cooling of the circulated cooling water, continuing to keep the temperature at 90° C., adding rest 0.5 g of benzoyl peroxide into the mixture g4, after adding the benzoyl peroxide, controlling the temperature at 90° C., and performing thermal insulation for 2 h; and (9) finally, distilling for 0.5 h at the vacuum degree of −0.1 MPa and the temperature of 100° C. to remove micromolecular impurities, thus obtaining the acrylate polymer F4.

Embodiment 5

| AH1 | |
|---|---|
| Acrylate polymer F1 | 60 |
| PPG1000 | 30 |
| Hydrophobic precipitation-method white carbon black Sipernat ®D10 | 5 |
| Alkyl modified polysiloxane $CH_3(CH_2)_{15}Si(CH_3)_2[OSi(CH_3)_2]_{20}OSi(CH_3)_2(CH_2)_{15}CH_3$ | 5 |

The acrylate polymer F1 prepared in the embodiment 1, PPG1000, hydrophobic precipitation-method white carbon black Sipernat®D10 and alkyl modified polysiloxane are mixed uniformly according to above proportion to prepare a non-silicon defoaming agent AH1.

Embodiment 6

| AH2 | |
|---|---|
| Acrylate polymer F2 | 20 |
| PPG600 | 60 |
| Hydrophobic precipitation-method white carbon black Sipernat ®D13 | 10 |
| Alkyl modified polysiloxane $CH_3(CH_2)_9Si(CH_3)_2[OSi(CH_3)_2]_{50}OSi(CH_3)_2(CH_2)_9CH_3$ | 10 |

The acrylate polymer F2 prepared in the embodiment 2, PPG600, hydrophobic precipitation-method white carbon black Sipernat®D13 and alkyl modified polysiloxane are mixed uniformly according to above proportion to prepare a non-silicon defoaming agent AH2.

Embodiment 7

| AH3 | |
|---|---|
| Acrylate polymer F3 | 60 |
| PPG2000 | 10 |
| Hydrophobic precipitation-method white carbon black Sipernat ®D17 | 10 |
| Alkyl modified polysiloxane $CH_3(CH_2)_{11}Si(CH_3)_2[OSi(CH_3)_2]_{45}OSi(CH_3)_2(CH_2)_{11}CH_3$ | 20 |

The acrylate polymer F3 prepared in the embodiment 3, PPG2000, hydrophobic precipitation-method white carbon black Sipernat®D17 and alkyl modified polysiloxane are mixed uniformly according to above proportion to prepare a non-silicon defoaming agent AH3.

Embodiment 8

| AH4 | |
|---|---|
| Acrylate polymer F4 | 47.5 |
| PPG400 | 50 |
| Hydrophobic precipitation-method white carbon black Zeofoam®163-2 | 0.5 |
| Polyether-modified polysiloxane $CH_3(PO)_{12}(EO)_{18}(CH_2)_3Si(CH_3)_2[OSi(CH_3)_2]_{80}OSi(CH_3)_2(CH_2)_3(EO)_{18}(PO)_{12}CH_3$ | 2 |

The acrylate polymer F4 prepared in the embodiment 4, PPG400, hydrophobic precipitation-method white carbon black Zeofoam®163-2 and polyether-modified polysiloxane are mixed uniformly according to above proportion to prepare a non-silicon defoaming agent AH4.

Contrast Example 1

(1) mixing 144 g of iso-octyl acrylate, 100 g of hydroxyethyl acrylate and 4.8 g of benzoyl peroxide, and fully dissolving the benzoyl peroxide by stirring to form a mixture a-I;

(2) mixing 50 g of alkene C1 and 0.8 g of benzoyl peroxide through stirring to fully dissolve the benzoyl peroxide and form a mixture b-I;

(3) mixing rest 36 g of iso-octyl acrylate and 0.8 g of benzoyl peroxide through stirring to fully dissolve the benzoyl peroxide and form a mixture c-I;

(4) adding 0.8 g of benzoyl peroxide into 662 g of diluent PPG-1000 while stirring, after complete adding of the benzoyl peroxide, heating to 80° C., performing thermal insulation for 10 min to fully dissolve the benzoyl peroxide and form a mixture d-I;

(5) under cooling of circulated cooling water, keeping the temperature of the mixture d-I at 80° C., dropwise adding the mixture a-I into the mixture d-I while stirring, and completely dropwise adding within 3 h to form a mixture e-I;

(6) after complete dropwise adding of the mixture a-I, under cooling of the circulated cooling water, continuing to keep the temperature at 80° C., continuing to dropwise add the mixture b-I into the mixture e-I, and completely dropwise adding within 1 h to form a mixture f-I;

(7), after complete dropwise adding of the mixture b-I, under cooling of the circulated cooling water, continuing to keep the temperature at 80° C., continuing to dropwise add mixture c-I into the mixture f-I, and completely dropwise adding within 1 h to form a mixture g-I;

(8) after complete dropwise adding of the mixture c-I, under cooling of the circulated cooling water, continuing to keep the temperature at 80° C., adding rest 0.8 g of benzoyl peroxide into the mixture g-I, after adding the benzoyl peroxide, controlling the temperature at 100° C., and performing thermal insulation for 2 h; and (9) finally, distilling for 2 h at the vacuum degree of −0.09 MPa and the temperature of −100° C. to remove micromolecular impurities, thus obtaining the acrylate polymer F-I.

Contrast Example 2

(1) mixing 320 g of iso-octyl acrylate, 200 g of hydroxyethyl methylacrylate, 10 g of unsaturated terminated polyether B2 and 2.4 g of benzoyl peroxide, and fully dissolving the benzoyl peroxide by stirring to form a mixture a-II;

(2) mixing rest 80 g of iso-octyl acrylate and 0.4 g of benzoyl peroxide through stirring to fully dissolve the benzoyl peroxide and form a mixture c-II;

(3) adding 0.4 g of benzoyl peroxide into 386.4 g of diluent PPG600 while stirring, after complete adding of the benzoyl peroxide, heating to 100° C., performing thermal insulation for 10 min to fully dissolve the benzoyl peroxide and form a mixture d-II;

(4) under cooling of circulated cooling water, keeping the temperature of the mixture d-II at 100° C., dropwise adding the mixture a-II into the mixture d-II while stirring, and completely dropwise adding within 5 h to form a mixture e-II;

(5) after complete dropwise adding of the mixture a-II, under cooling of the circulated cooling water, continuing to keep the temperature at 100° C., continuing to dropwise add the mixture c-II into the mixture e-II, and completely dropwise adding within 1 h to form a mixture g-II;

(6), after complete dropwise adding of the mixture c-II, under cooling of the circulated cooling water, continuing to keep the temperature at 100° C., adding rest 0.4 g of benzoyl peroxide into the mixture g-II, after adding the benzoyl peroxide, controlling the temperature at 100° C., and performing thermal insulation for 2 h; and (7) finally, distilling for 1 h at the vacuum degree of −0.09 MPa and the temperature of 100° C. to remove micromolecular impurities, thus obtaining the acrylate polymer F-II.

Contrast Example 3

(1) mixing 240 g of iso-octyl methylacrylate, 100 g of hydroxyethyl acrylate and 3.6 g of benzoyl peroxide, and fully dissolving the benzoyl peroxide by stirring to form a mixture a-III;

(2) mixing rest 60 g of iso-octyl methylacrylate and 0.6 g of benzoyl peroxide through stirring to fully dissolve the benzoyl peroxide and form a mixture c-III;

(3) adding 0.6 g of benzoyl peroxide into 594.6 g of diluent PPG2000 while stirring, after complete adding of the benzoyl peroxide, heating to 60° C., performing thermal insulation for 10 min to fully dissolve the benzoyl peroxide and form a mixture d-III;

(4) under cooling of circulated cooling water, keeping the temperature of the mixture d-III at 60° C., dropwise adding the mixture a-III into the mixture d-III while stirring, and completely dropwise adding within 1 h to form a mixture e-III;

(5) after complete dropwise adding of the mixture a-III, under cooling of the circulated cooling water, continuing to keep the temperature at 60° C., continuing to dropwise add the mixture c-III into the mixture f-III, and completely dropwise adding within 2 h to form a mixture g-III;

(6) after complete dropwise adding of the mixture c-III, under cooling of the circulated cooling water, continuing to keep the temperature at 60° C., adding rest 0.6 g of benzoyl peroxide into the mixture g-III, after adding the benzoyl peroxide, controlling the temperature at 120° C., and performing thermal insulation for 2 h; and (7) finally, distilling for 3 h at the vacuum degree of −0.1 MPa and the temperature of 100° C. to remove micromolecular impurities, thus obtaining the acrylate polymer F-III.

Contrast Example 4

(1) mixing 400 g of iso-octyl methylacrylate, 100 g of hydroxyethyl methylacrylate, 40 g of unsaturated terminated polyether B4 and 3 g of benzoyl peroxide, and fully dissolving the benzoyl peroxide by stirring to form a mixture a-IV;

(2) mixing 10 g of alkene C4 and 0.5 g of benzoyl peroxide through stirring to fully dissolve the benzoyl peroxide and form a mixture b-IV;

(3) adding 0.5 g of benzoyl peroxide into 445.5 g of diluent PPG400 while stirring, after complete adding of the benzoyl peroxide, heating to 90° C., performing thermal insulation for 10 min to fully dissolve the benzoyl peroxide and form a mixture d-IV;

(4) under cooling of circulated cooling water, keeping the temperature of the mixture d-IV at 90° C., dropwise adding the mixture a-IV into the mixture d-IV while stirring, and completely dropwise adding within 2 h to form a mixture e-IV;

(5) after complete dropwise adding of the mixture a-IV, under cooling of the circulated cooling water, continuing to keep the temperature at 90° C., continuing to dropwise add the mixture b-IV into the mixture e-IV, and completely dropwise adding within 2 h to form a mixture f-IV;

(6), after complete dropwise adding of the mixture b-IV, under cooling of the circulated cooling water, continuing to keep the temperature at 90° C., adding rest 0.5 g of benzoyl peroxide into the mixture f-IV, controlling the temperature at 90° C., and performing thermal insulation for 2 h; and (7) finally, distilling for 0.5 h at the vacuum degree of −0.1 MPa and the temperature of 100° C. to remove micromolecular impurities, thus obtaining the acrylate polymer F-IV.

Contrast Example 5

(1) mixing 80 g of iso-octyl acrylate, 100 g of hydroxyethyl methylacrylate, 80 g of unsaturated terminated polyether B2, 50 g of alkene C2 and 5.6 g of benzoyl peroxide, and fully dissolving the benzoyl peroxide by stirring to form a mixture a-V;

(2) mixing rest 20 g of iso-octyl acrylate and 0.8 g of benzoyl peroxide through stirring to fully dissolve the benzoyl peroxide and form a mixture c-V;

(3) adding 0.8 g of benzoyl peroxide into 662 g of diluent PPG600 while stirring, after complete adding of the benzoyl peroxide, heating to 100° C., performing thermal insulation for 10 min to fully dissolve the benzoyl peroxide and form a mixture d-V;

(4) under cooling of circulated cooling water, keeping the temperature of the mixture d-V at 100° C., dropwise adding the mixture a-V into the mixture d-V while stirring, and completely dropwise adding within 5 h to form a mixture e-V;

(5) after complete dropwise adding of the mixture a-V, under cooling of the circulated cooling water, continuing to keep the temperature at 100° C., continuing to dropwise add the mixture c-V into the mixture e-V, and completely dropwise adding within 1 h to form a mixture g-V;

(6), after complete dropwise adding of the mixture c-V, under cooling of the circulated cooling water, continuing to keep the temperature at 100° C., adding rest 0.8 g of benzoyl peroxide into the mixture g-V, after adding the benzoyl peroxide, controlling the temperature at 100° C., and performing thermal insulation for 2 h; and (7) finally, distilling for 1 h at the vacuum degree of −0.09 MPa and the temperature of 100° C. to remove micromolecular impurities, thus obtaining the acrylate polymer F-V.

Contrast Example 6

| AH-I | |
|---|---|
| Acrylate polymer F-I | 60 |
| PPG1000 | 30 |
| Hydrophobic precipitation-method white carbon black Zeofoam®163-2 | 5 |
| Alkyl modified polysiloxane (same as embodiment 5) | 5 |

The acrylate polymer F-I prepared in the contrast example 1, PPG1000, hydrophobic precipitation-method white carbon black Zeofoam®163-2 and alkyl modified polysiloxane are mixed uniformly according to above proportion to prepare a defoaming agent AH-I.

Contrast Example 7

| AH-II | |
|---|---|
| Acrylate polymer F-II | 20 |
| PPG600 | 60 |
| Hydrophobic precipitation-method white carbon black Sipernat®D10 | 10 |
| Alkyl modified polysiloxane (same as embodiment 6) | 10 |

The acrylate polymer F-II prepared in the contrast example 2, PPG600, hydrophobic precipitation-method white carbon black Sipernat®D10 and alkyl modified polysiloxane are mixed uniformly according to above proportion and stirred for 0.5-2 h under normal temperature to prepare a defoaming agent AH-II.

Contrast Example 8

| AH-III | |
|---|---|
| Acrylate polymer F-III | 60 |
| PPG2000 | 10 |
| Hydrophobic precipitation-method white carbon black Sipernat®D10 | 10 |
| Alkyl modified polysiloxane (same as embodiment 7) | 20 |

The acrylate polymer F-III prepared in the contrast example 3, PPG2000, hydrophobic precipitation-method white carbon black Sipernat®D13 and alkyl modified polysiloxane are mixed uniformly according to above proportion to prepare a defoaming agent AH-III.

Contrast Example 9

| AH-IV | |
|---|---|
| Acrylate polymer F-IV | 47.5 |
| PPG400 | 50 |
| Hydrophobic precipitation-method white carbon black Sipernat®D10 | 0.5 |
| Alkyl modified polysiloxane (same as embodiment 7) | 2 |

The acrylate polymer F-IV prepared in the contrast example 4, PPG400, hydrophobic precipitation-method white carbon black Sipernat®D17 and alkyl modified polysiloxane are mixed uniformly according to above proportion to prepare a defoaming agent AH-IV.

Contrast Example 10

| AH-V | |
|---|---|
| Acrylate polymer F-V | 20 |
| PPG600 | 60 |
| Hydrophobic precipitation-method white carbon black Sipernat®D10 | 10 |
| Alkyl modified polysiloxane (same as embodiment 5) | 10 |

The acrylate polymer F-V prepared in the contrast example 5, PPG600, hydrophobic precipitation-method white carbon black Sipernat®D17 and alkyl modified polysiloxane are mixed uniformly according to above proportion to prepare a defoaming agent AH-V.

Contrast Example 11

| AH-VI | |
|---|---|
| Mineral oil | 85 |
| White carbon black Sipernat®D10 | 8 |
| EBS | 3 |
| Oleic acid polyoxyethylene(10EO)ether | 4 |

The mineral oil, white carbon black Sipernat®D10, EBS and Oleic acid polyoxyethylene(10EO)ether are mixed uniformly according to above proportion to prepare a defoaming agent AH-VI.

Contrast Example 12

Compared with the embodiment C23 in Patent CN101189282B, in the embodiment C23, mainly the silicone grease and silicone polyether are compounded to prepare a defoaming agent AH-VII. Specifically:

| AH-VII | |
|---|---|
| Siloxane defoaming agent (selected from the siloxane defoaming agent A3 in Patent CN101189282) | 20 |
| Polysiloxane copolymer (selected from the polymer 1 in Patent CN101189282) | 10 |
| Dehydrated sorbitol fatty acid ester | 10 |
| Water | 60 |

Contrast Example 13

| AH-VIII | |
|---|---|
| Acrylate polymer (selected from Patent U.S. Pat. No. 5,152,925A) | 60 |
| PPG1000 | 30 |
| Hydrophobic precipitation-method white carbon black Sipernat®D13 | 5 |
| Alkyl modified polysiloxane (same as the embodiment 5) | 5 |

Contrast Example 14

The copolymer prepared in the embodiment 1 in Patent CN102428142B replaces the acrylate polymer F1 in the embodiment A to prepare a defoaming agent AH-IX.

| AH-IX | |
|---|---|
| Acrylate polymer (selected from Patent CN102428142B) | 60 |
| PPG1000 | 30 |
| Hydrophobic precipitation-method white carbon black Sipernat®D10 | 5 |
| Alkyl modified polysiloxane (same as the embodiment 5) | 5 |

Contrast Example 15

A defoaming agent AH-X is prepared according to a formula in a table 4 in Patent CN102428142B.

| AH-X | |
|---|---|
| PPG1000 | 58.5 |
| Hydrophobic silica Sipernat®D10 | 3 |
| Acrylate polymer (selected from the embodiment 1 in Patent CN102428142B) | 23.5 |
| Polyether-modified polysiloxane silicone surfactant | 10 |
| Alkyl-modified siloxane silicone wax | 5 |

Defoaming and Foam Inhibiting Performance Test

Test Method 600 mL of sodium dodecyl benzene sulfonate water solution with the mass percent of 1% is added into a circulation farming instrument with a glass tube having the scale of 0-500 mL and the inner diameter of 5 cm, the liquid level reaches to the lowest scale "0 ml", then the temperature is set as 80° C., the flow is set as 6 L/min, the voltage is set as 220V, then a temperature control switch is switched on to heat the sodium dodecyl benzene sulfonate water solution to set temperature, then a circulating pump is opened to burst and foam, 0.2 mL of defoaming agent is added after the foam rises to the 350 mL, and the change of the foam height along with time is recorded. If the time that the foam reaches the lowest scale is shorter and the reached scale is lower, the instant defoaming performance of the defoaming agent is better; and if the time that the foam reaches the 350 mL position is longer, the foam inhibiting performance of the defoaming agent is better.

TABLE 1

Result of the defoaming and foam inhibiting performance test

Foam height/mL

| Time/s | AH1 | AH2 | AH3 | AH4 | AH-I | AH-II | AH-III | AH-IV | AH-V | AH-VI | AH-VII | AH-VIII | AH-IX | AH-X |
|---|---|---|---|---|---|---|---|---|---|---|---|---|---|---|
| 0 | 350 | 350 | 350 | 350 | 350 | 350 | 350 | 350 | 350 | 350 | 350 | 350 | 350 | 350 |
| 5 | 200 | 220 | 210 | 200 | 310 | 210 | 320 | 250 | 280 | 270 | 250 | 240 | 250 | 240 |
| 10 | 180 | 180 | 180 | 190 | 280 | 180 | 280 | 230 | 260 | 250 | 220 | 200 | 200 | 200 |
| 15 | 170 | 170 | 180 | 160 | 260 | 160 | 250 | 200 | 200 | 230 | 190 | 190 | 180 | 170 |
| 30 | 160 | 160 | 170 | 160 | 210 | 150 | 200 | 180 | 180 | 200 | 180 | 180 | 180 | 170 |
| 60 | 150 | 160 | 170 | 160 | 200 | 150 | 180 | 180 | 180 | 210 | 180 | 180 | 170 | 160 |
| 90 | 150 | 150 | 170 | 150 | 180 | 140 | 170 | 160 | 160 | 250 | 160 | 170 | 160 | 160 |
| 120 | 140 | 150 | 160 | 140 | 160 | 130 | 170 | 160 | 160 | 280 | 150 | 170 | 160 | 150 |
| 150 | 140 | 150 | 150 | 140 | 150 | 150 | 190 | 160 | 160 | 310 | 150 | 160 | 150 | 150 |
| 180 | 130 | 150 | 15 | 150 | 130 | 150 | 190 | 150 | 170 | 350 | 150 | 150 | 150 | 140 |
| 210 | 130 | 140 | 150 | 160 | 150 | 170 | 210 | 160 | 170 |  | 150 | 150 | 140 | 140 |
| 240 | 130 | 140 | 150 | 160 | 160 | 190 | 250 | 170 | 160 |  | 150 | 150 | 140 | 140 |
| 270 | 140 | 150 | 160 | 160 | 180 | 210 | 280 | 180 | 160 |  | 160 | 150 | 140 | 140 |
| 300 | 140 | 160 | 160 | 180 | 180 | 250 | 300 | 180 | 160 |  | 170 | 160 | 150 | 150 |
| 330 | 150 | 160 | 170 | 190 | 200 | 270 | 320 | 180 | 190 |  | 170 | 170 | 170 | 160 |
| 360 | 170 | 170 | 180 | 190 | 210 | 300 | 350 | 180 | 200 |  | 180 | 180 | 180 | 180 |
| 390 | 190 | 180 | 190 | 200 | 230 | 320 |  | 200 | 210 |  | 200 | 190 | 190 | 200 |
| 420 | 210 | 210 | 210 | 230 | 250 | 350 |  | 210 | 230 |  | 230 | 210 | 220 | 220 |
| 450 | 230 | 240 | 220 | 250 | 280 |  |  | 220 | 260 |  | 260 | 230 | 230 | 230 |
| 480 | 250 | 260 | 250 | 280 | 310 |  |  | 250 | 280 |  | 280 | 250 | 250 | 250 |
| 510 | 290 | 290 | 270 | 310 | 330 |  |  | 280 | 320 |  | 310 | 290 | 280 | 280 |
| 540 | 300 | 310 | 300 | 320 | 350 |  |  | 300 | 350 |  | 350 | 310 | 310 | 310 |
| 570 | 320 | 330 | 320 | 330 |  |  |  | 350 |  |  |  | 350 | 350 | 350 |
| 600 | 330 | 350 | 350 | 350 |  |  |  |  |  |  |  |  |  |  |

It can be seen from above data that compared with the polymer defoaming agent AH-I not prepared by modifying through the unsaturated terminated polyether, the defoaming agents AH1-AH4 in the present invention improve the instant defoaming capacity of the defoaming agent; compared with the polymer defoaming agent AH-II not prepared by modifying through the alkene, the defoaming agents AH1-AH4 further improve the foam inhibiting capacity; compared with the polymer defoaming agent AH-III not prepared by modifying through the unsaturated terminated polyether or the alkene, the defoaming agents AH1-AH4 in the present invention greatly improve the instant defoaming capacity and the foam inhibiting capacity; compared with the polymer defoaming agent AH-IV not prepared by adding the acrylate monomer step by step to form a polymer with one hydrophobic end, the defoaming agents AH1-AH4 further improve the instant defoaming capacity; compared with the polymer AH-V prepared by mixing and dropwise adding instead of dropwise adding the unsaturated terminated polyether and the alkene step by step, the defoaming agents AH1-AH4 only improve the instant defoaming capacity and improve the foam inhibiting capacity; compared with the existing mineral oil defoaming agent AH-VI, the existing organic silicon defoaming agent AH-VII taking the silicone grease as the active substance, the defoaming agents AH1-AH4 are obviously improved in the instant defoaming capacity and foam inhibiting capacity; and compared with the existing acrylate polymer defoaming agent, the defoaming agents AH1-AH4 are obviously improved in the instant defoaming capacity and foam inhibiting capacity by modifying through the unsaturated terminated polyether and the alkene and process changing.

The present invention belongs to the technical field of fine chemical engineering, and discloses a non-silicon defoaming agent, comprising an acrylate polymer, an organic solvent carrier, hydrophobic particles and defoaming auxiliaries; and the acrylate polymer is prepared from following raw material components: monomer-1, monomer-2, unsaturated terminated polyether, alkene, diluent and initiator. The present invention further discloses a preparing method for the non-silicon defoaming agent. The present invention further discloses the application of the non-silicon defoaming agent to the defoaming and foam inhibiting in systems rich in anionic surfactants. The defoaming agent in the present invention takes the acrylate polymer as the main active substance and has excellent defoaming and foam inhibiting performance. By dropwise adding monomers, the defoaming performance of the acrylate polymer is improved, by using unsaturated terminated polyether to modify, the hydrophilia of the acrylate polymer is improved, the instant defoaming capacity is further improved, and by the alkene with the carbon atoms of 6-22 to modify, the foam inhibiting performance of the defoaming agent is improved.

What is claimed is:

1. A non-silicon defoaming agent comprising an acrylate polymer, an organic solvent carrier, a plurality of hydrophobic particles and a plurality of defoaming auxiliaries; wherein a use level of the acrylate polymer is 15-70% of a total mass of the non-silicon defoaming agent, a use level of the organic solvent carrier is 10-70% of the total mass of the non-silicon defoaming agent, a use level of the plurality of hydrophobic particles is 0.1-15% of the total mass of the non-silicon defoaming agent, and a use level of the plurality of defoaming auxiliaries is 1-25% of the total mass of the non-silicon defoaming agent;

the acrylate polymer is prepared from following raw material components: a first monomer, a second monomer, an unsaturated terminated polyether, an alkene, a diluent and an initiator; a total use level of the first monomer and the second monomer is 20-70% of a total mass of the raw material components, a use level of the unsaturated terminated polyether is 1-10% of the total mass of the raw material components, a use level of the alkene is 1-8% of the total mass of the raw material components, a use level of the diluent is 20-75% of the total mass of the raw material components, and a use level of the initiator is 0.2-1% of the total mass of the raw material components.

2. The non-silicon defoaming agent according to claim 1, wherein the use level of the acrylate polymer is 20-60% of the total mass of the non-silicon defoaming agent, the use level of the organic solvent carrier is 10-70% of the total mass of the non-silicon defoaming agent, the use level of the plurality of hydrophobic particles is 0.5-10% of the total mass of the non-silicon defoaming agent, and the use level of the plurality of defoaming auxiliaries is 2-20% of the total mass of the non-silicon defoaming agent.

3. The non-silicon defoaming agent according to claim 1, wherein the total use level of the first monomer and the second monomer is 20-60% of the total mass of the raw material components, the use level of the unsaturated terminated polyether is 1-8% of the total mass of the raw material components, the use level of the alkene is 1-8% of the total mass of the raw material components, the use level of the diluent is 30-70% of the total mass of the raw material components, and the use level of the initiator is 0.4-0.8% of the total mass of the raw material components.

4. The non-silicon defoaming agent according to claim 1, wherein a preparing method of the acrylate polymer comprises:
mixing the first monomer, the second monomer and the unsaturated terminated polyether, with the initiator; wherein a use level of the first monomer, the second monomer and the unsaturated terminated polyether is 70-90% of the total use level of the first monomer, wherein a first use level of the initiator is 50-70% of a total use level of the initiator to cause the initiator to be fully dissolved and form a first mixture;
mixing the alkene with the initiator, wherein a second use level of the initiator is 5-15% of the total use level of the initiator to fully dissolve the initiator and form a second mixture;
mixing the rest first monomer with the initiator, wherein a third use level of the initiator is 2-15% of the total use level of the initiator to fully dissolve the initiator and form a third mixture;
at 60-100° C., fully dissolving the initiator in the diluent, wherein a fourth use level of the initiator is 8-15% of the total use level of the initiator, and releasing a plurality of free radicals to form a fourth mixture;
at 60-100° C., in order to prevent a generation of a plurality of excessive free radicals causing a severe polymerization and further causing a danger, dropwise adding the first mixture into the fourth mixture, controlling a first dropwise adding time to be 1-5 h, and forming a fifth mixture; during dropwise adding, enabling a first temperature to be 60-100° C. by circulated water or an ice bath;
after completely dropwise adding the first mixture, at 60-100° C., similarly, in order to prevent the generation of the plurality of excessive free radicals causing the severe polymerization and further causing the danger, dropwise adding the second mixture into the fifth mixture, controlling a second dropwise adding time to be 1-2 h, and forming a sixth mixture; during dropwise adding, enabling a second temperature to be 60-100° C. by the circulated water or the ice bath;
after completely dropwise adding the second mixture, at 60-100° C., dropwise adding the third mixture into the sixth mixture, controlling a third dropwise adding time to be 1-2 h, and forming a seventh mixture; during dropwise adding, enabling a third temperature to be 60-100° C. by the circulated water or the ice bath;
after completely dropwise adding the third mixture, at 60-100° C., adding the rest initiator into the seventh mixture to obtain an eighth mixture, then regulating a fourth temperature to 80-120° C. and performing a thermal insulation at the fourth temperature for 1-3 h; and
distilling the eighth mixture for 0.5-3 h at a vacuum degree of −0.09-0.1 MPa and a temperature of 90-110° C. to remove a plurality of micromolecular impurities, thus obtaining the acrylate polymer.

5. The non-silicon defoaming agent according to claim 1, wherein a ratio of the first monomer to the second monomer is between 1:1-4:1;
the first monomer is an alkyl acrylate or an octadecyl methacrylate;
the second monomer is a hydroxyalkyl acrylate or a hydroxyalkyl methylacrylate as shown in the following general formula:

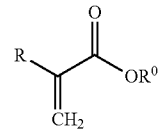

wherein, R is H or a methyl; $R^0$ is a straight chain or a branched chain alkyl of 1-20 carbon atoms, and a position of the straight chain or the branched chain alkyl at least contains one hydroxyl.

6. The non-silicon defoaming agent according to claim 5, wherein the first monomer is an iso-octyl acrylate or an iso-octyl methacrylate; the second monomer is a hydroxyethyl acrylate or a hydroxyethyl methylacrylate.

7. A preparing method for the non-silicon defoaming agent according to claim 1, comprising: uniformly mixing the acrylate polymer, the organic solvent carrier, the plurality of hydrophobic particles and the plurality of defoaming auxiliaries to obtain the non-silicon defoaming agent.

* * * * *